United States Patent
Bolloli et al.

(10) Patent No.: US 10,529,982 B2
(45) Date of Patent: Jan. 7, 2020

(54) PREPARATION METHOD FOR A POSITIVE ELECTRODE FOR LITHIUM-SULPHUR ELECTROCHEMICAL BATTERY

(71) Applicant: Commissariat à l'Énergie Atomique et aux Énergies Alternatives, Paris (FR)

(72) Inventors: Marco Bolloli, Grenoble (FR); Céline Barchasz, Fontaine (FR); Fabien Claudel, Saint Martin D'Heres (FR)

(73) Assignee: COMMISSARIAT Á L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 151 days.

(21) Appl. No.: 15/823,056

(22) Filed: Nov. 27, 2017

(65) Prior Publication Data

US 2018/0151870 A1    May 31, 2018

(30) Foreign Application Priority Data

Nov. 28, 2016  (FR) ...................... 16 61584

(51) Int. Cl.
| | | |
|---|---|---|
| *H01M 4/1393* | (2010.01) | |
| *H01M 4/62* | (2006.01) | |
| *H01M 4/02* | (2006.01) | |
| *H01M 10/052* | (2010.01) | |
| *C01B 17/22* | (2006.01) | |
| *C01D 15/00* | (2006.01) | |

(52) U.S. Cl.
CPC ......... *H01M 4/1393* (2013.01); *H01M 4/622* (2013.01); *H01M 10/052* (2013.01); *C01B 17/22* (2013.01); *C01D 15/00* (2013.01); *H01M 2004/028* (2013.01)

(58) Field of Classification Search
CPC ...... C01B 17/22; C01D 15/00; H01M 10/052; H01M 2004/021; H01M 2004/028; H01M 4/0416; H01M 4/136; H01M 4/1393; H01M 4/1397; H01M 4/5815; H01M 4/622; H01M 4/625; H01M 4/663; H01M 4/806
See application file for complete search history.

(56) References Cited

U.S. PATENT DOCUMENTS

| | | |
|---|---|---|
| 2002/0106561 A1 | 8/2002 | Lee et al. |
| 2014/0220453 A1 | 8/2014 | Barchasz et al. |
| 2015/0372291 A1 | 12/2015 | Ryu et al. |

OTHER PUBLICATIONS

French Search Report for FR 1661584 dated May 8, 2017.

*Primary Examiner* — Basia A Ridley
*Assistant Examiner* — Heng M. Chan
(74) *Attorney, Agent, or Firm* — Pearne & Gordon LLP

(57) ABSTRACT

The invention relates to a method for the preparation of a positive electrode for a lithium-sulphur battery and which comprises the following steps: a step for impregnation, of a non-woven material made of carbon fibres with a porosity of at least 90% and a mass per unit surface area of at least 10 g/m$^2$, with a first composition comprising at least one electrically-conductive inorganic carbon-containing additive, at least one polymer binder and at least one solvent; a step for drying the non-woven material thus impregnated; a step for bringing the non-woven material into contact with a second composition comprising a sulphur-containing active material.

18 Claims, 2 Drawing Sheets

PREPARATION METHOD FOR A POSITIVE ELECTRODE FOR LITHIUM-SULPHUR ELECTROCHEMICAL BATTERY

This application claims priority from French Patent Application No. 16 61584 filed on Nov. 28, 2016. The content of this application is incorporated herein by reference in its entirety.

TECHNICAL FIELD

The present invention relates to a preparation method for a positive electrode for a lithium-sulphur electrochemical battery.

The general field of the invention may thus be defined as that of energy storage devices, in particular that of lithium electrochemical batteries, and yet more specifically of lithium-sulphur electrochemical batteries.

STATE OF THE PRIOR ART

Energy storage devices are conventionally electrochemical batteries which operate on the principle of electrochemical cells capable of delivering an electric current due to the presence in each of them of an electrode pair (a positive and negative electrode respectively) separated by an electrolyte, where the electrodes comprise specific materials capable of reacting in accordance with an oxidation-reduction reaction, as a result of which electrons are produced at the source of the electric current and ions are produced which pass from one electrode to the other by means of an electrolyte.

The most commonly used batteries in current use are the following:
- Ni-MH batteries which use a metal hydride and nickel oxyhydroxide as electrode materials;
- Ni—Cd batteries which use cadmium and nickel oxyhydroxide as electrode materials;
- lead-Acid batteries which use lead and lead oxide $PbO_2$ as electrode materials; and
- lithium batteries, such as lithium-ion batteries, which conventionally use, entirely or in part, lithium-containing materials as electrode materials.

Because lithium is a particularly light solid element and exhibits a particularly low electrochemical potential, lithium batteries have to a large extent replaced the other batteries mentioned above as a result of the continuous improvement in the performance of Li-ion batteries in terms of energy density. Lithium-ion batteries can indeed achieve energy densities per unit mass and per unit volume (which today may reach close to 300 $Wh.kg^{-1}$) which are significantly greater than those of Ni-MH and Ni—Cd batteries (which can range from 50 to 100 $Wh.kg^{-1}$) and Lead-acid batteries (which can range from 30 to 35 $Wh.kg^{-1}$). Furthermore, Li-ion batteries can exhibit a nominal cell voltage which is greater than that for the other batteries (for example a nominal voltage of the order of 3.6 V for a cell which uses the $LiCoO_2$/graphite pair as electrode materials, as opposed to a nominal voltage of the order of 1.5 V for the other aforementioned batteries). These systems also exhibit low self-discharge and a long service life (ranging, for example, from 500 to 1000 cycles).

Because of their intrinsic properties Li-ion batteries promise to be of particular interest in fields where endurance is a criterion of primary importance, as is the case in the fields of information technology, video, telephones, in transportation such as electric vehicles, hybrid vehicles, or in medical, aerospace and microelectronics fields. However, the level of performance achieved with lithium-ion battery technology has currently reached a ceiling.

A new battery technology based on lithium is currently emerging as a promising technology. This is lithium/sulphur technology in which the positive electrode comprises elemental sulphur or a sulphur derivative, such as lithium sulphide or lithium polysulphide, as an active material.

The use of sulphur as the active material of a positive electrode is particularly attractive, since sulphur theoretically offers a very high specific capacity which may be 10 times greater than that obtained for conventional positive electrode materials (of the order of 1675 mAh/g instead of 140 mAh/g for $LiCoO_2$). Furthermore, sulphur is abundant on the planet, and as a result is characterised by low costs. Finally, it is of low toxicity. All of these qualities contribute to making it particularly attractive for the purpose of large-scale use, in particular for electric vehicles, even more so since lithium/sulphur batteries can achieve energy densities per unit mass which can range from 300 to 600 $Wh.g^{-1}$.

From a functional point of view, the reaction at the origin of current production (that is, when the battery is in discharge mode) uses an oxidation reaction of the lithium at the negative electrode which produces electrons, which feed the external circuit to which the positive and negative electrodes are connected, and a reduction reaction of the sulphur at the positive electrode.

Thus, in explicit terms, in the discharge process the overall reaction is as follows:

$$S_8 + 16Li \rightarrow 8Li_2S$$

which is the sum of the sulphur reduction reaction at the positive electrode ($S_8 + 16e^- \rightarrow 8S^{2-}$) and of the lithium oxidation reaction at the negative electrode ($Li \rightarrow Li^+ + e^-$).

It is to be understood that the reverse electrochemical reactions occur during the charging process.

As the above equation shows, the reaction involves an exchange of 16 electrons, which explains the high specific capacity of the sulphur (1675 $mAh·g^{-1}$).

From a mechanistic point of view, and without being bound by theory, in the initial state (that is, when the battery is in the fully-charged state) the active material, which is elemental sulphur, is present in the solid state in the positive electrode. During the course of reduction of the sulphur, that is during discharge, the cyclic sulphur molecules are reduced and form linear chains of lithium polysulphide, with the general formula $Li_2S_n$, where n can be from 2 and 8. Since the initial molecule is $S_8$, the first compounds formed are long-chain lithium polysulphides, such as $Li_2S_8$ or $Li_2S_6$. Since these lithium polysulphides are soluble in organic electrolytes, the first discharge step therefore involves the solubilisation of the active material in the electrolyte, and the production of long-chain lithium polysulphides in solution. Then, as the reduction of the sulphur takes place, the chain length of the polysulphides is gradually reduced, and compounds such as $Li_2S_5$, $Li_2S_4$ or $Li_2S_2$ are formed in solution. Finally, the reduction end-product is lithium sulphide ($Li_2S$) which is insoluble in organic electrolytes. Thus the last step in the sulphur reduction mechanism involves precipitation of the sulphur-containing active material.

This mechanism can be correlated with the discharge profile shown in FIG. 1, which shows a graph of the change in potential E (in V) as a function of the capacity C (in a.u.).

In this profile the first plateau can in effect be attributed to the formation of long chains of lithium polysulphides, whereas the second plateau corresponds to the reduction in the size of the sulphur containing chains, until passivation of the positive electrode occurs.

Nevertheless, lithium-sulphur batteries exhibit a certain number of drawbacks.

The first limitation is kinetic in nature, since sulphur is an insulating material. The sulphur is also soluble in the organic electrolytes used. Once dissolved it may contribute to causing corrosion of the lithium negative electrode, and is responsible for the significant degree of self-discharge of lithium-sulphur batteries.

The polysulphide intermediates are also soluble in the electrolyte and can react with the negative electrode. They therefore also promote battery self-discharge. Moreover, they are responsible for setting up a shuttle mechanism which occurs on charging, and which results in the deterioration of the battery performance, in particular in terms of the Coulombic efficiency. Finally, the discharge product $Li_2S$ is itself insoluble in the electrolyte and an electron insulator. It therefore precipitates at the end of discharge and passivates the surface of the electrodes which then become inactive. This means that the capacities obtained in practice may in general be well below the theoretical capacity and of the order of 300 to 1000 $mAh·g^{-1}$ (where the theoretical capacity is of the order of 1675 $mAh·g^{-1}$).

Thus there are improvements to be made concerning the architecture of the batteries, for example, at the sulphur-based positive electrode, the electrolyte, the separator and the negative electrode.

From a structural point of view a lithium/sulphur battery conventionally comprises at least one electrochemical cell comprising two electrodes based on different materials (a positive electrode which comprises elemental sulphur as its active material, and a negative electrode comprising metallic lithium as its active material), between which a liquid organic electrolyte is arranged.

As regards the positive electrode comprising sulphur, this is conventionally obtained by a method involving coating onto a substrate which constitutes the current collector, to give an assembly made up of two parts, formed by the current collector and the positive collector per se. More specifically, as shown in FIG. 2, first of all an ink is made comprising a solvent, the active sulphur-containing material, a carbon-containing material (to improve the overall electron-conductivity of the electrode) and a binder (Part a) of FIG. 2). Secondly the ink is deposited onto a substrate which is intended to form the current collector, which is in general a metal sheet (such as an aluminium strip) (Part b) of FIG. 2). After evaporation of the solvent and drying, an electrode comprising sulphur deposited on a current collector is thus obtained (Part c) of FIG. 2), where the resulting assembly is then incorporated into a cell comprising a separator impregnated with organic liquid electrolyte, a negative electrode, where the negative electrode and the positive electrode are arranged on either side of the separator. The percentage of sulphur in the electrode is generally high, generally from 50 to 90% and preferably above 70% by mass, so as to obtain batteries with high energy-densities.

The discharge mechanism for a lithium-sulphur battery which uses such a positive electrode first of all involves a step for dissolution of the active material, which results in the initial structure of the porous electrode collapsing, due to the high percentage of sulphur in the electrode. After the sulphur dissolves, the porosity of the electrode is such that the structure cannot be supported and collapses. The available electrode surface area is therefore reduced and grains of material, or of carbon/binder composite, may break free of the support formed by the current collector. This damage, which thus results in a loss of active surface area, proves to be critical at the end of discharge, since the species formed ($Li_2S_2$, $Li_2S$, etc.) are both highly insulating and insoluble in the organic electrolyte. Consequently they precipitate at the positive electrode and are responsible for gradual passivation of the latter. Since the thickness of the deposited material is limited to a few nanometres ($Li_2S$ is insulating and therefore passivating), the deposition of a significant quantity of active material therefore depends on the available electrode conductive specific surface area.

Furthermore the final discharge compound $Li_2S$ occupies twice the volume of the sulphur, which may also contribute to the positive electrode structure breaking down into powder at the end of discharge. In conclusion, the solution/precipitation cycles of the active materials which are inherent in the discharge mechanism are therefore responsible for the low capacity returned in practice and for the poor cycling behaviour of lithium-sulphur batteries.

In the light of the existing situation, the authors of the present invention therefore proposed to develop a new method for the preparation of a positive electrode for a lithium-sulphur battery, wherein the structure does not collapse during the course of cycling and wherein significant improvements in the capacity per unit mass of the resulting electrode can be achieved.

DESCRIPTION OF THE INVENTION

Thus the invention relates to a preparation method for a positive electrode for a lithium-sulphur battery which comprises the following steps:

a) a step for impregnation of a non-woven material made of carbon fibres, with a porosity of at least 90% and a mass per unit surface area of at least 10 $g/m^2$, by a first composition comprising at least one electrically-conductive inorganic carbon-containing additive, at least one polymer binder and at least one solvent;

b) a step for drying the non-woven material thus impregnated;

c) a step for bringing the non-woven material into contact with a second composition comprising a sulphur-containing active material.

It has been observed, surprisingly, that by using such a method, in particular by using a non-woven material which meets the aforementioned specific requirements in terms of porosity and mass per unit surface area, it is possible to obtain significant improvements relating to the capacity per unit mass of the resulting electrode and significant improvement in the energy density per unit mass of the battery in which the positive electrode has been incorporated. The fact that the support of the sulphur-containing active material is made of a non-woven material made of carbon fibres also prevents the positive electrode structure gradually collapsing over the cycling process.

Before going further into the description, the following definitions should be pointed out.

The term non-woven material made of carbon fibres means a product comprised of a web, a sheet or a mat of carbon fibres, either spread in a given direction or randomly, and whose internal cohesion is achieved by mechanical and/or physical and/or chemical methods and/or by a combination of these various methods, excluding by weaving or knitting. In our case the non-woven material exhibits two essential characteristics, which are porosity (which is at least 90%) and mass per unit surface area (which is at least 10 $g/m^2$).

It is pointed out that the term porosity relates to the volume of the voids in the non-woven material relative to their total volume. In order to measure it, the non-woven material, whose quantity and geometric characteristics (length, width and depth) are known, is placed in a known initial volume of electrolyte. Measurements of the difference between the volume of electrolyte after the immersion of the non-woven material and the initial electrolyte volume are then performed, where this difference corresponds to the void volume of the non-woven material. The porosity is deduced from this using the ratio of the void volume to the total volume of the non-woven material.

As regards the mass per unit surface area, this is determined by measuring the mass of the non-woven material, then dividing the mass by the surface area in $m^2$ of said non-woven material.

More specifically, the porosity is preferably equal to or greater than 92%. For example, the porosity can range from 92 to 98%.

More specifically the mass per unit surface area can range from 10 $g/m^2$ to 20 $g/m^2$.

Moreover the non-woven material made of carbon fibres may exhibit a specific surface area ranging from 0.01 to 5 $m^2/g$.

It should be pointed out that the specific surface area is measured using the BET method, implemented using Micromeritics Tristar II-Surface Area and Porosity apparatus, with this method being described in the Journal of the American Chemical Society, p. 309 (60), 1938.

According to step a), the non-woven material made of carbon fibres which meets the above mentioned specific requirements is impregnated with a first composition comprising at least one electrically-conductive inorganic carbon-containing additive, at least one polymer binder and at least one solvent.

As regards the electrically-conductive inorganic carbon-containing additive, this is advantageously a carbon-black powder. This type of additive has the specific feature that is has a high specific surface area, such as a specific surface area of at least 200 $m^2/g$ (measured by gas adsorption/desorption). It may also in particular be carbon-black powders supplied under the name of Ketjenblack® (sold by AzkoNobel), Vulcan® (sold by Cabot) and mixtures of these.

This electrically-conductive inorganic carbon-containing additive may be present in the composition at a concentration ranging from 30 to 80% of the total mass of the first composition (excluding solvent).

As regards the solvent, this may be water, an organic solvent or a mixture of organic solvents or again a mixture comprising one or more organic solvents and water.

Moreover, the first composition may comprise electrically-conductive additives other than carbon-black powders, such as carbon fibres, such as carbon fibres obtained in the vapour phase.

The carbon fibres obtained in the vapour phase may be those supplied under the VGCF® brand.

As regards the polymer binder, it may be chosen from:
polymer binders belonging to the cellulosic polymer category, such as carboxymethylcellulose (known by the abbreviation CMC), methylcellulose (known by the abbreviation MC);
polymer binders belonging to the fluorinated ethylene polymer category, such as polytetrafluoroethylene (known by the abbreviation PTFE);
polymer binders belonging to the vinyl polymer category, such as poly(vinyl alcohol) (known by the abbreviation PVA); and
mixtures of these.

The polymer binders may fulfil several roles:
they increase the cohesion between the various ingredients of the first composition and in particular the carbon-containing additive or additives;
they are used to control the viscosity of the first composition.

The polymer binder may be present in the first composition at a concentration ranging from 10 to 30% of the total mass of the first composition (excluding solvent).

The first composition may include, moreover, at least one surfactant (such as those supplied under the SDS®, Triton® brands).

Surfactants improve the dispersion of the electrically-conductive inorganic carbon-containing additive or additives.

The method of the invention may comprise, before step a) is implemented, a step for preparation of the first composition, said preparation comprising an operation for bringing the ingredients of said first composition (electrically-conductive inorganic carbon-containing additive(s), polymer binder(s), solvent(s), any surfactant(s)) into contact, followed by an operation for dispersion of the composition using a blender.

The first composition is then used, according to the method of the invention, to impregnate the non-woven material (step b), where this impregnation step may comprise one or more operations for coating the non-woven material with the first composition.

Once impregnated in this way, the non-woven material undergoes a drying step, where this drying step can be carried out at a temperature ranging from ambient temperature to 100° C., more specifically at 80° C. (±20° C.) over a period which can range from 1 hour to 24 hours, with the aim of removing all or part of the solvent or solvents.

Moreover, after step b) and before step c), the method may advantageously comprise a step for sintering (called step b') of the dried non-woven material, that is, a thermal treatment step carried out at a temperature and over a time period that are effective for achieving consolidation of the ingredients of the first composition within the non-woven material (except for any surfactants which degrade and which are volatilised during the sintering). It also serves to ensure that the polymer binder or binders are well distributed in the porosity after flowing, which could improve the homogeneity of the final structure. By way of an example, the sintering step may be carried out at a temperature that is greater by at least 20% than the fusion temperature of the polymeric binder or binders, for example, over a period of 30 minutes in air. By way of an example, a temperature of 350° C. for 30 minutes may be used for sintering of a composition containing a binder of the polytetrafluoroethylene type.

After step b), or if relevant step b'), the method comprises a step for bringing the non-woven material thus dried, and if relevant, sintered, into contact with a second composition comprising a sulphur-containing active material. This step can take place directly after step b), or after step b') if relevant, and before the electrode is put in place in a lithium-sulphur battery (so-called first alternative) or may be implemented after the electrode is incorporated in a lithium-sulphur battery and the latter brought into operation (so-called second alternative), in which case the second composition will correspond to the electrolyte comprising, moreover, the sulphur-containing active material.

According to the first alternative, the second composition comprises a sulphur-containing active material and may moreover comprise an electrically-conductive inorganic carbon-containing additive and a polymer binder.

The sulphur-containing active material may be elemental sulphur ($S_8$) or lithium disulphide ($Li_2S$), and this sulphur-containing active material may be present in the second composition at a concentration ranging from 50 to 90% by mass relative to the total mass of the composition, for example at a concentration of 80%.

The electrically conductive inorganic carbon-containing additive may be a carbon-black powder, which may be present in the second composition at a concentration of from 2 to 50% by mass relative to the total mass of the composition, for example at a concentration of 10%.

As for the binder, it may be chosen from the following polymer binders:
  polymer binders belonging to the cellulosic polymer category, such as carboxymethylcellulose (known by the abbreviation CMC), methylcellulose (known by the abbreviation MC);
  polymer binders belonging to the fluorinated ethylene polymer category, such as polytetrafluoroethylene (known by the abbreviation PTFE), polyvinylidene-fluoride (known by the abbreviation PVDF);
  polymer binders belonging to the vinyl polymer category, such as poly(vinyl alcohol) (known by the abbreviation PVA); and
  mixtures of these,
  this may be present at a concentration ranging from 2 to 20% by mass relative to the total mass of the second composition, for example at a concentration of 10%.

Whether for step a) or step c), the impregnation or bringing components into contact may be envisaged using various techniques, such as:
  dip-coating;
  spin-coating;
  laminar-flow-coating or meniscus coating;
  spray-coating;
  roll-to-roll process;
  paint coating;
  screen printing; or
  techniques which use a horizontal knife for deposition (known as "tape-coating").

Once the impregnation has been carried out, the non-woven material thus impregnated may undergo a drying step, with the aim of removing volatile species and fixing the ingredients of the second composition on the non-woven material. This drying step can be carried out at a temperature ranging from ambient temperature to 100° C., for example a temperature of 80° C. for 30 minutes.

According to the second alternative, the second composition corresponds to an electrolyte used in the lithium-sulphur battery, said electrolyte comprising amongst other things the sulphur-containing active material, which corresponds to a battery operating in accordance with a catholyte type configuration. The sulphur-containing active material is advantageously a lithium polysulphide compound of formula $Li_2S_n$ where n is an integer from 2 to 8.

This compound thus forms the source of sulphur for the positive electrode.

In this case the amount of lithium polysulphide compound introduced in the electrolyte is chosen depending on the specific surface area of the non-woven material from step b) or b') of the method of the invention, the latter dictating the amount of active material that it is possible to deposit. For example, the lithium polysulphide compound may be dissolved in the electrolyte at a concentration ranging from 0.25 $mol \cdot L^{-1}$ to the saturation concentration.

Moreover, the electrolyte serving as the second composition conventionally comprises at least one organic solvent and at least one lithium salt.

The organic solvent or solvents may be, for example, a solvent comprising one or more ether, nitrile, sulphone and/or carbonate functions with, for example, a carbon chain which may comprise from 1 to 10 carbon atoms.

The following may be cited by way of examples of solvents which comprise a carbonate function:
  cyclic carbonate solvents, such as ethylene carbonate (represented by the abbreviation EC), propylene carbonate (represented by the abbreviation PC).
  linear carbonate solvents, such as diethyl carbonate (represented by the abbreviation DEC), dimethyl carbonate (represented by the abbreviation DMC), ethylmethyl carbonate (represented by the abbreviation EMC).

The following could be cited by way of examples of solvents comprising an ether function: ether solvents, such as 1,3-dioxolane (represented by the abbreviation DIOX), tetrahydrofuran (represented by the abbreviation THF), 1,2-dimethoxyethane (represented by the abbreviation DME), or an ether of general formula $CH_3O-[CH_2CH_2O]_n-OCH_3$ (where n is an integer from 1 to 10), such as tetraethyleneglycol dimethylether (represented by the abbreviation TEGDME) and mixtures of these.

Preferably the organic solvent is an ether solvent or a mixture of ether solvents.

The lithium salt may be chosen from the group made up of $LiPF_6$, $LiClO_4$, $LiBF_4$, $LiAsF_6$, LiI, $LiNO_3 LiR_fSO_3$ (where $R_f$ represents a perfluoroalkyl group comprising 1 to 8 carbon atoms), $LiN(CF_3SO_2)_2$ (also known as lithium bis[(trifluoromethyl)sulfonyl]imide represented by the abbreviation LiTFSI), $LiN(C_2F_5SO_2)_2$ (also known as lithium bis[(perfluoroethyl)sulfonyl]imide represented by the abbreviation LiBETI), $LiCH_3SO_3$, $LiB(C_2O_4)_2$ (also known as lithium bis(oxalato)borate or LiBOB) and mixtures of these, with preference given to a $LiTFSI/LiNO_3$ mixture.

The lithium salt may be present in the electrolyte at a concentration ranging from 0.25M to 2M, for example 1M.

The positive electrodes obtained according to the method of the invention are, because of the ingredients that they contain, structures capable of fulfilling both the role of positive electrode and the role of current collector.

They also form self-supporting structures, that is, they do not need to rest against a support in order to be used in a lithium-sulphur battery.

They form a single piece, that is, they are not the result of attaching together a positive electrode and a current collector.

The positive electrodes according to the method of the invention are intended to be assembled in a lithium-sulphur battery comprising at least one cell which comprises:
  a positive electrode obtained according to the method of the invention as defined above;
  a negative electrode; and
  an electrolyte which conducts lithium ions, arranged between said structure and said negative electrode.

The following definitions should be pointed out.

The term positive electrode conventionally relates, both above and hereafter, to the electrode serving as the cathode when the battery is passing current (that is, when it is in the process of discharging) and which serves as the anode when the battery is in the process of charging.

The term negative electrode conventionally relates, both above and hereafter, to the electrode serving as the anode, when the battery is passing current (that is, when it is in the process of discharging) and which serves as the cathode when the battery is in the process of charging.

The negative electrode may be self-supporting (that is, it does not need to rest against a support, such as a current collector support) or may comprise, preferably, a current collector substrate whereupon at least the active material of the negative electrode is placed, where this active material advantageously may be metallic lithium.

The current collector substrate may be made of a metallic material (composed of a single metallic element or of an alloy of a metallic element and another element), which takes, for example, the form of a plate or strip, where a specific example of a current collector substrate may be a stainless steel or copper plate. The current collector substrate may also be made of a carbon-containing material.

The electrolyte is an electrolyte which conducts lithium ions, where this electrolyte may be in particular a liquid electrolyte comprising at least an organic solvent and at least one lithium salt, such as defined above.

Moreover when the battery is operating in accordance with a catholyte configuration, the electrolyte may comprise at least one lithium polysulphide compound of formula $Li_2S_n$ where n is an integer from 2 to 8, as defined above.

In lithium-sulphur batteries, the above mentioned liquid electrolyte may, in the electrochemical cells of the lithium-sulphur batteries, impregnate a separator which is arranged between the positive electrode and the negative electrode of the electrochemical cell.

This separator may be made of a porous material, such as a polymer material, capable of holding the liquid electrolyte in its pores.

The electrolyte may also be a gel electrolyte, which in this case represents an electrolyte containing an organic solvent and a lithium salt, similar to those described above, impregnating a porous matrix which swells by absorbing the electrolyte. Such a matrix may be a polyoxyethylene (known by the abbreviation POE), a polyacrylonitrile (known by the abbreviation PAN), a polymethyl methacrylate (known by the abbreviation PMMA), polyvinylidene fluoride (known by the abbreviation PVDF) and their derivatives.

The invention will now be described with reference to the specific embodiments defined below, with reference to the appended figures.

DETAILED DESCRIPTION OF PARTICULAR EMBODIMENTS

Example 1

Figure 1:
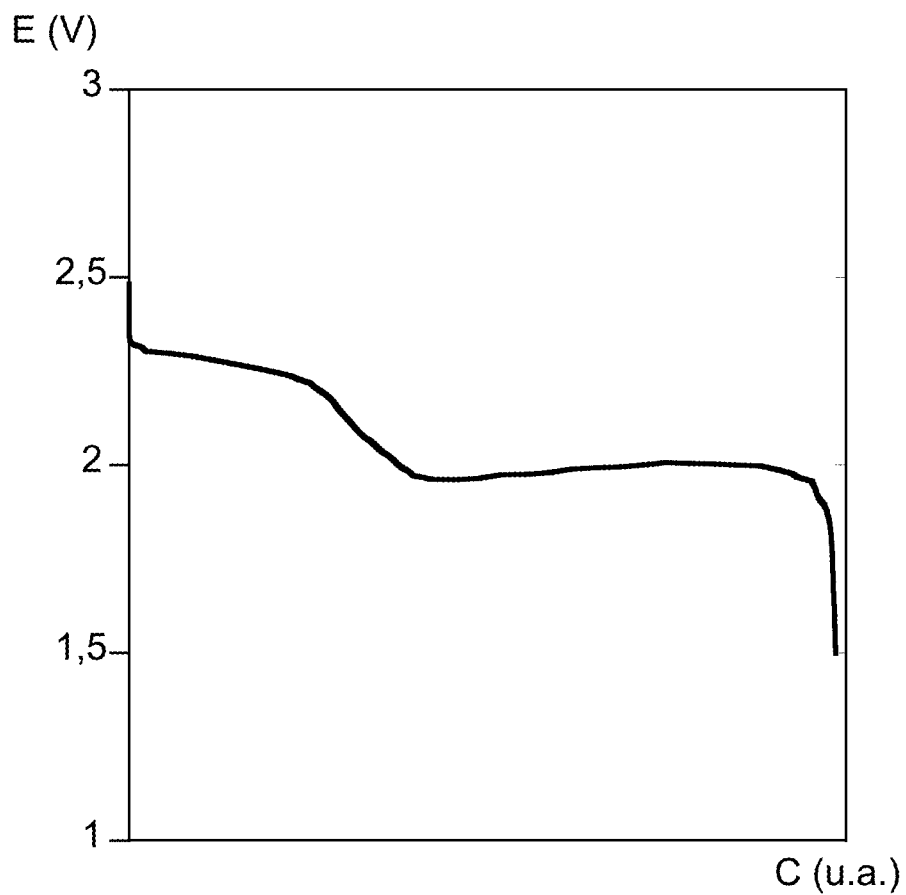
FIG. 1 is a graph showing the change in potential E (in V) as a function of the capacity C (in a.u.).
Figure 2:
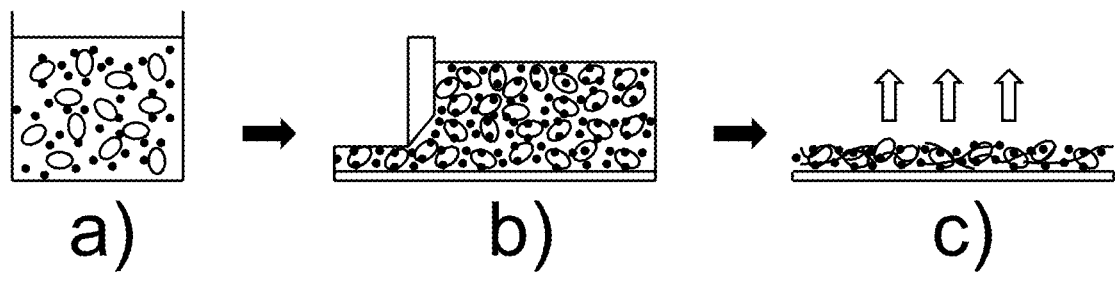
FIG. 2 is a method flow-chart showing the preparation of a positive electrode according to the state of the art.
Figure 3:
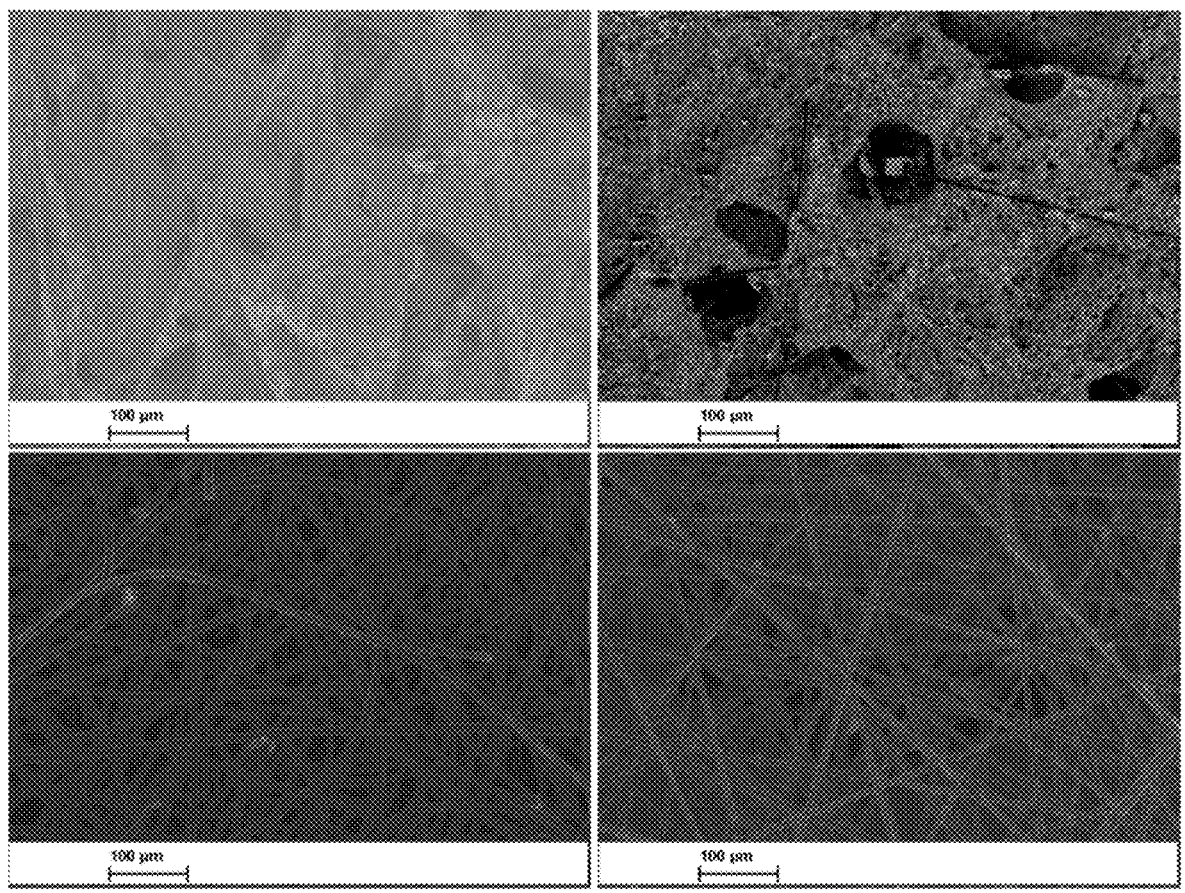
FIG. 3 shows photographs taken using a scanning electron microscope (500 times) of structures used in examples 1, 2, comparative example 1, comparative example 4 (from left to right and top to bottom respectively).

The present example shows the preparation of a positive electrode obtained according to the method in accordance with the invention.

In order to achieve this, a non-woven material made of carbon fibres which exhibits a porosity of 92% and a mass per unit surface area of 20 g/m$^2$ is impregnated with a first composition comprising the following ingredients:

0.25 g of Ketjenblack® carbon-black powder (that is 38.37% by dry mass after sintering);
0.25 g of VGCF® carbon fibres obtained in the vapour phase (that is 38.37% by dry mass after sintering);
0.28 g of Triton X-100 surfactant (0% by dry mass after sintering); and
0.25 g of polytetrafluoroethylene (PTFE) (23.25% by dry mass after sintering).

The dry extract (namely the percentage per unit mass of dry product in the composition) is 1.61%.

The non-woven material thus impregnated is dried at 95° C. for one hour in air.

The non-woven material thus impregnated is then sintered at 350° C. for 30 minutes.

The proportions of carbon (Ketjenblack® and VGCF®) and of PTFE to the total mass of non-woven material after sintering are 48% and 14% respectively.

The non-woven material is then coated, by using a comb, with a second composition which comprises:

8 g of elemental sulphur (79.92% by dry mass);
1 g of Ketjenblack® (9.99% by dry mass); and
50 g of carboxymethylcellulose (10.09% by dry mass).

After coating, drying is carried out at 80° C. in air for 30 minutes.

The resulting positive electrode has a quantity of sulphur of 6.114 mg/cm$^2$.

Example 2

The present example shows the preparation of a positive electrode obtained according to the method in accordance with the invention, and more specifically according to methods similar to those of example 1, except that:

the non-woven material made of carbon fibres has a porosity of 92% and a mass per unit surface area of 17 g/m$^2$;
the proportions of carbon (Ketjenblack® and VGCF®) and of PTFE in the total mass of the non-woven material after sintering are 47% and 14% respectively;
the amount of sulphur present in the electrode is 4.660 mg/cm$^2$.

Example 3

The present example shows the preparation of a positive electrode obtained according to the method in accordance with the invention, and more specifically according to methods similar to those of example 1, except that:

the non-woven material made of carbon fibres has a porosity of 92% and a mass per unit surface area of 10 g/m$^2$;
the proportions of carbon (Ketjenblack® and VGCF®) and of PTFE in the total mass of non-woven material after sintering are 44% and 13% respectively;
the amount of sulphur present in the electrode is 5.055 mg/cm$^2$.

Comparative Example 1

The present example shows the preparation of a positive electrode obtained according to a method not in accordance with the invention.

In order to do this, a non-woven felt of carbon (product reference H2315V1 from Freudenberg) was coated with the second composition comprising sulphur from example 1.

After coating, drying is carried out at 80° C. in air for 30 minutes.

The positive electrode obtained has a quantity of sulphur of 4.652 mg/cm².

Comparative Example 2

The present example shows the preparation of a positive electrode obtained according to a method not in accordance with the invention.

In order to do this, a non-woven material made of carbon fibres which exhibits a porosity of 92% and a mass per unit surface area of 17 g/m² is impregnated with a composition comprising the following ingredients:
- 0.60 g of Ketjenblack® carbon-black powder (that is 14.98% by dry mass after sintering);
- 0.60 g of VGCF® carbon fibre obtained in the vapour phase (that is 14.98% by dry mass after sintering);
- 2.40 g of elemental sulphur (59.94% by dry mass after sintering);
- 20 g of carboxymethylcellulose (10.10% by dry mass after sintering).

The amount of sulphur present in the electrode is 4.970 mg/cm².

After impregnation, drying is carried out at 80° C. in air for 30 minutes.

Comparative Example 3

A supercapacitor electrode (aluminium strip coated with high specific surface area carbon, carbon loading about 55 g/m²) was coated with sulphur with the second composition comprising elemental sulphur described in Example 1.

After coating, drying is carried out at 80° C. in air for 30 minutes.

The amount of sulphur present in the electrode is 4.753 mg/cm².

Comparative Example 4

A non-woven material made of carbon fibres exhibiting a porosity of 92% and a mass per unit surface area of 17 g/m² was coated with the second composition comprising elemental sulphur of example 1.

After coating, drying is carried out at 80° C. in air for 30 minutes.

The amount of sulphur present in the electrode is 5.304 mg/cm².

Example 4

A Scanning Electron Microscope (LEO 1530 FEG-SEM) was used to obtain the following respective images:
- of the non-woven material of example 1 after impregnation of the first composition (photograph at top left);
- of the non-woven material of example 2 after impregnation of the first composition (photograph at top right);
- of the non-woven carbon felt of comparative example 1 before impregnation with the composition defined in comparative example 1 (photograph at bottom left);
- of the non-woven material of comparative example 4 before impregnation with the composition defined in comparative example 4 (photograph at bottom right).

The photograph of comparative example 1 shows a structure which has macropores whose diameters vary between 40 and 150 microns. As for the fibres, they have a length of several millimetres and, preferably, a diameter of between 5 and 15 microns. The photograph of comparative example 4 shows a structure exhibiting a high degree of porosity such as the non-woven material used in the context of the invention, before impregnation with high specific surface area carbon. The structure shows a degree of macroporosity which is comparable with that of Comparative example 1, with fibres whose diameters are between 6 and 8 micrometres.

The photographs of the structures of examples 1 and 2 show the effect of treatment based on carbon-containing materials. The surface porosity is visibly reduced, and the macropores exhibit diameters of less than 50 micrometres. Furthermore, the presence of nanometre carbon particles results in the creation of meso- and micropores within the initial fibrous structure.

Example 5

In this example the masses per unit volume, the active surface areas as well as the porosities of the structures of examples 1, comparative 1 and 4 defined in example 4 above were measured (that is, after impregnation with the first composition for example 1 and before impregnation for comparative examples 1 and 4).

The value of the mass per unit volume was obtained from the ratio of the mass (of a 14 mm diameter disk cut from the above mentioned structures) to the volume, obtained by measuring the dimensions using a micrometric gauge. The measurement was reproduced 10 times and the results are reported in the Table below.

The value of the active surface area was obtained by means of gas adsorption-desorption measurements at 77K, performed using TriStar II (MICROMERITICS) apparatus. The data obtained at a partial pressure of gas below 0.3 were processed according to the BET method. The active surface area values obtained are also reported in the table below.

The table below also shows the porosity values.

| Structure | Density (g · cm⁻³) | Active surface area (m² · g⁻¹) | Porosity (%) |
|---|---|---|---|
| EXAMPLE 1 | 0.25 ± 0.05 | 125 ± 10 | 82.2 |
| COMPARATIVE EXAMPLE 1 | 0.46 ± 0.01 | <LOD* | 80 |
| COMPARATIVE EXAMPLE 4 | 0.08 ± 0.01 | <LOD* | 92.0 |

*LOD represents the limit of detection

The values in the table show that through the use of a non-woven carbon material with an initial porosity of 94%, after appropriate impregnation treatment it is possible to obtain a structured product which combines the porosity of the best products of the state of the art with a high active surface area.

Example 6

In this example, the positive electrodes obtained in the preceding examples were tested in batteries in order to determine the capacities per unit mass on discharge.

The batteries used were button batteries designed in the following manner.

Disks of diameter 14 mm were cut out of the positive electrodes obtained in the examples previously described above and dried under vacuum (20 torr) at 80° C. for 48 hours. They were then incorporated as a positive electrode into a "button battery" type battery (CR2032) constructed in this manner:

a negative electrode made of lithium of thickness 130 μm, cut out to a diameter of 16 mm and deposited on a disk of stainless steel acting as a current collector;

a positive electrode as described above;

a Celgard® 2400 separator and a Viledon® separator, impregnated with a liquid electrolyte based on LiTFSI (1 mol.L$^{-1}$), LiNO$_3$ (0.1 mol.L$^{-1}$) and Li$_2$S$_6$ (0.25 mol.L$^{-1}$) salt in solution in a 50/50 by volume TEGDME (tetraethylene glycol dimethylether)-DIOX (Dioxolane) mixture.

The batteries obtained were sealed in an inert atmosphere and tested during galvanostatic cycling at C/20. The results are reported in the following table.

| Positive electrode | Discharge capacity—1$^{st}$ cycle (mAh/g) | Discharge capacity—5$^{th}$ cycle (mAh/g) |
| --- | --- | --- |
| Example 1 | 576.3 | 483.6 |
| Example 2 | 547.2 | 420.8 |
| Example 3 | 569.4 | 444.8 |
| Comparative example 1 | 308.0 | 218.9 |
| Comparative example 2 | 342.0 | 253.7 |
| Comparative example 3 | 125.7 | 96.4 |
| Comparative example 4 | 214.7 | 157.9 |

This shows that the discharge capacity per unit mass of the positive electrodes prepared in accordance with the method of the invention is nearly doubled compared with the discharge capacities per unit mass of the comparative examples.

The invention claimed is:

1. Preparation method for a positive electrode for a lithium-sulphur battery, comprising the following steps:
    a) a step for impregnation, of a non-woven material made of carbon fibres with a porosity of at least 90% and a mass per unit surface area of at least 10 g/m$^2$, with a first composition comprising at least one electrically-conductive inorganic carbon-containing additive, at least one polymer binder and at least one solvent;
    b) a step for drying the non-woven material thus impregnated;
    c) a step for bringing the non-woven material into contact with a second composition comprising a sulphur-containing active material.

2. Method according to claim 1, wherein the mass per unit surface area ranges from 10 to 20 g/m$^2$.

3. Method according to claim 1, wherein the electrically conductive carbon-containing inorganic additive is a carbon-black powder.

4. Method according to claim 3, wherein the first composition moreover comprises carbon fibres.

5. Method according to claim 1, wherein the polymer binder is chosen from cellulosic polymers, fluorinated ethylene polymers, vinyl polymers and mixtures thereof.

6. Method according to claim 1, further including after step b) and before step c) a step for sintering of the dried non-woven material (called step b').

7. Method according to claim 1, wherein the step c) occurs directly after step b) and before the electrode is put in place in the lithium-sulphur battery (so-called first alternative) or is carried out after incorporation of the electrode in the lithium-sulphur battery and operation of the latter (so-called second alternative).

8. Method according to claim 7 wherein, according to the first alternative, the second composition moreover comprises an electrically-conductive inorganic carbon-containing additive and at least one polymer binder.

9. Method according to claim 8, wherein the sulphur-containing active material is elemental sulphur (S$_8$) or lithium disulphide (Li$_2$S).

10. Method according to claim 7 wherein, according to the second alternative, the second composition corresponds to an electrolyte used in a lithium-sulphur battery.

11. Method according to claim 10, wherein the sulphur-containing active material is a lithium polysulphide compound of formula Li$_2$S$_n$ where n is an integer from 2 to 8.

12. Method according to claim 10, wherein the second composition moreover comprises at least one organic solvent and at least one lithium salt.

13. Method according to claim 6, wherein the step c) occurs directly after step b') and before the electrode is put in place in a lithium-sulphur battery (so-called first alternative) or is carried out after incorporation of the electrode in a lithium-sulphur battery and operation of the latter (so-called second alternative).

14. Method according to claim 13 wherein, according to the first alternative, the second composition moreover comprises an electrically-conductive inorganic carbon-containing additive and at least one polymer binder.

15. Method according to claim 14, wherein the sulphur-containing active material is elemental sulphur (S$_8$) or lithium disulphide (Li$_2$S).

16. Method according to claim 13 wherein, according to the second alternative, the second composition corresponds to an electrolyte used in a lithium-sulphur battery.

17. Method according to claim 16, wherein the sulphur-containing active material is a lithium polysulphide compound of formula Li$_2$S$_n$ where n is an integer from 2 to 8.

18. Method according to claim 16, wherein the second composition moreover comprises at least one organic solvent and at least one lithium salt.

* * * * *